United States Patent
Clarke (10) Patent No.: US 9,506,403 B2
(45) Date of Patent: Nov. 29, 2016

(54) FASTENER

(71) Applicant: ROLLS-ROYCE PLC, London (GB)

(72) Inventor: Samuel John MacLaren Clarke, Stroud (GB)

(73) Assignee: ROLLS-ROYCS plc, London (GB)

( * ) Notice: Subject to any disclaimer, the term of this patent is extended or adjusted under 35 U.S.C. 154(b) by 5 days.

(21) Appl. No.: 14/593,483

(22) Filed: Jan. 9, 2015

(65) Prior Publication Data

US 2015/0204242 A1 Jul. 23, 2015

(30) Foreign Application Priority Data

Jan. 17, 2014 (GB) .................................. 1400776.9

(51) Int. Cl.
*F16L 27/11* (2006.01)
*F02C 7/06* (2006.01)
(Continued)

(52) U.S. Cl.
CPC . *F02C 7/06* (2013.01); *F01D 9/06* (2013.01); *F01D 25/04* (2013.01); *F01D 25/18* (2013.01); *F01D 25/24* (2013.01); *F16B 5/0241* (2013.01); *F16B 5/0258* (2013.01); *F16L 5/025* (2013.01); *F16L 5/12* (2013.01); *F16L 27/11* (2013.01); *F16L 27/111* (2013.01); *F05D 2250/184* (2013.01)

(58) Field of Classification Search
CPC ....... F16L 27/10; F16L 27/11; F16L 27/107; F16L 27/111
USPC ................................. 285/224, 226, 299, 300
See application file for complete search history.

(56) References Cited

U.S. PATENT DOCUMENTS 1,475,289 A * 11/1923 Diescher ................. F16L 51/00
138/118
1,505,121 A * 8/1924 Allport .................. F16L 51/028
138/121

(Continued)

FOREIGN PATENT DOCUMENTS

CN 202 402 800 U 8/2012
CN 202 597 914 U 12/2012

(Continued)

OTHER PUBLICATIONS

May 19, 2015 Search Report issued in European Patent Application No. 15 15 0266.

(Continued)

*Primary Examiner* — Brent W Herring
(74) *Attorney, Agent, or Firm* — Oliff PLC (57) ABSTRACT

The present invention provides a fastener for securing two pipe adapters within a casing such as a gas turbine casing. The fastener comprises a fastener body having a central bore for receiving the pipe adapters and having a first engagement portion, e.g. a radial projection extending into said central bore, for engagement with a first pipe adapter. The central bore has a second engagement portion, e.g. a threaded portion, for engagement with a second pipe adapter. The fastener further comprises an outer wall at least partly surrounding and spaced from the fastener body in a concentric arrangement. The outer wall comprises a fastener flange extending radially in a direction away from the fastener body for overlaying the casing. At least a portion of the outer wall is deformable (e.g. formed as bellows) so that, in use, axial and/or radial movement of the pipe adapters is dampened.

15 Claims, 6 Drawing Sheets

(51) Int. Cl.
*F16L 27/111* (2006.01)
*F01D 9/06* (2006.01)
*F01D 25/04* (2006.01)
*F01D 25/18* (2006.01)
*F01D 25/24* (2006.01)
*F16B 5/02* (2006.01)
*F16L 5/02* (2006.01)
*F16L 5/12* (2006.01)

(56) References Cited

U.S. PATENT DOCUMENTS

| | | | | |
|---|---|---|---|---|
| 2,044,430 | A * | 6/1936 | Hall | F16L 51/028 285/300 |
| 2,640,317 | A * | 6/1953 | Fentress | F02K 1/80 285/300 |
| 2,712,456 | A * | 7/1955 | McCreery | F01N 13/1811 285/145.5 |
| 3,053,554 | A * | 9/1962 | Magos | F16L 27/02 285/114 |
| 3,692,337 | A * | 9/1972 | Mischel | F16L 27/111 285/226 |
| 3,820,829 | A * | 6/1974 | Hasselbacher et al. | F16L 51/025 285/226 |
| 4,511,162 | A * | 4/1985 | Broyles | F17D 5/02 285/226 |
| 4,548,427 | A * | 10/1985 | Press | F16L 27/107 285/114 |
| 4,854,611 | A * | 8/1989 | Press | F16L 27/111 285/114 |
| 4,958,860 | A * | 9/1990 | Akitsu | F16L 27/1012 285/114 |
| 5,090,746 | A * | 2/1992 | Holzhausen | F01N 13/1811 285/226 |
| 5,145,215 | A * | 9/1992 | Udell | F01N 13/1816 285/226 |
| 5,358,287 | A * | 10/1994 | Winzen | F16L 27/1021 285/144.1 |
| 5,370,427 | A * | 12/1994 | Hoelle | F16L 27/026 285/226 |
| 5,407,237 | A * | 4/1995 | Smolowitz | F16L 27/11 285/114 |
| 5,480,194 | A * | 1/1996 | Mantoan | F01N 13/1816 285/226 |
| 5,542,715 | A * | 8/1996 | Mantoan | F01N 13/1816 285/226 |
| 5,653,478 | A * | 8/1997 | McGurk | F16L 27/11 285/227 |
| 5,957,504 | A * | 9/1999 | Cwik | F01N 13/1805 285/226 |
| 6,279,961 | B1 * | 8/2001 | Stoltz | F16L 27/125 15/1.7 |
| 6,464,257 | B1 * | 10/2002 | Cwik | B21C 37/20 285/227 |
| 6,568,715 | B2 * | 5/2003 | Cwik | F01N 13/1816 285/299 |
| 7,341,283 | B2 * | 3/2008 | Moses | E21B 17/085 285/223 |
| 7,841,627 | B2 * | 11/2010 | Springmann | F16L 27/082 285/121.2 |
| 2002/0171240 | A1 * | 11/2002 | Cwik | F01N 13/1816 285/301 |
| 2005/0167978 | A1 * | 8/2005 | Moses | E21B 17/085 285/223 |
| 2009/0309355 | A1 * | 12/2009 | Turfait | F01N 13/1816 285/145.5 |

FOREIGN PATENT DOCUMENTS

| | | |
|---|---|---|
| CN | 103 062 510 A | 4/2013 |
| CN | 103 090 117 A | 5/2013 |
| CN | 103 123 020 A | 5/2013 |
| CN | 103090116 A | 5/2013 |
| CN | 103 133 783 A | 6/2013 |
| EP | 0 575 727 A1 | 12/1993 |
| EP | 1 821 057 A1 | 8/2007 |
| EP | 1 867 909 A2 | 12/2007 |
| GB | 2125502 A | 3/1984 |

OTHER PUBLICATIONS

Jul. 16, 2014, Search Report issued in United Kingdom Application No. GB1400776.9.

* cited by examiner

FASTENER

FIELD OF THE INVENTION

The present invention relates to a fastener for securing two pipe adapters and particularly, but not exclusively, to a fastener for securing two pipe adapters in a high temperature/pressure environment such as within the casing of a gas turbine.

BACKGROUND OF THE INVENTION

Gas turbines extract energy from a hot gas stream received from a combustor and the energy is used to power a fan, propeller, compressor or generator.

Each turbine includes an assembly of bladed discs mounted on and rotatable about a turbine bearing support structure and enclosed within a turbine casing.

The turbine bearing support structure typically contains internal service pipes for oil feed, scavenge and venting of bearing chambers, ducting high pressure air from the compressor and to provide air for sealing or cooling. All of these internal service pipes need to be connected to external pipework (i.e. pipework outside the turbine casing). The connections between the internal and external pipes are typically provided within the turbine casing which exposes the connections to the elevated temperatures and pressures within the turbine.

Figure 1:
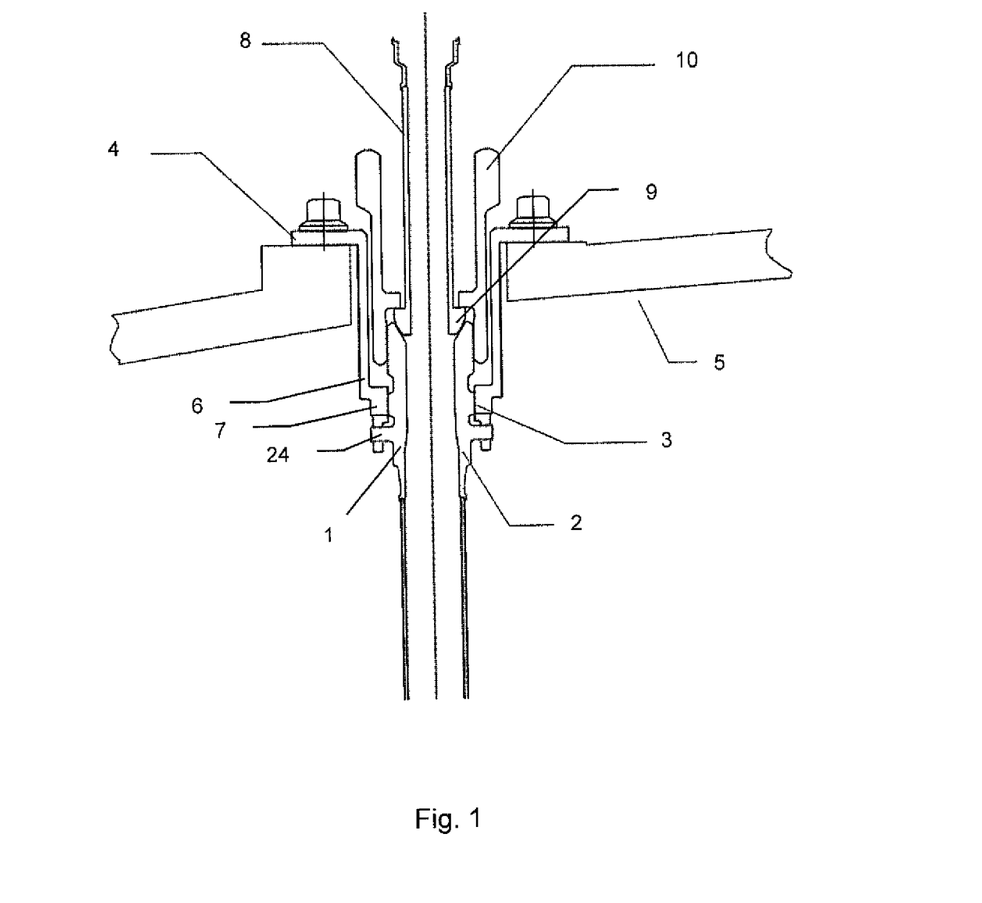
FIG. 1 shows a prior art fastener assembly.
Figure 2:
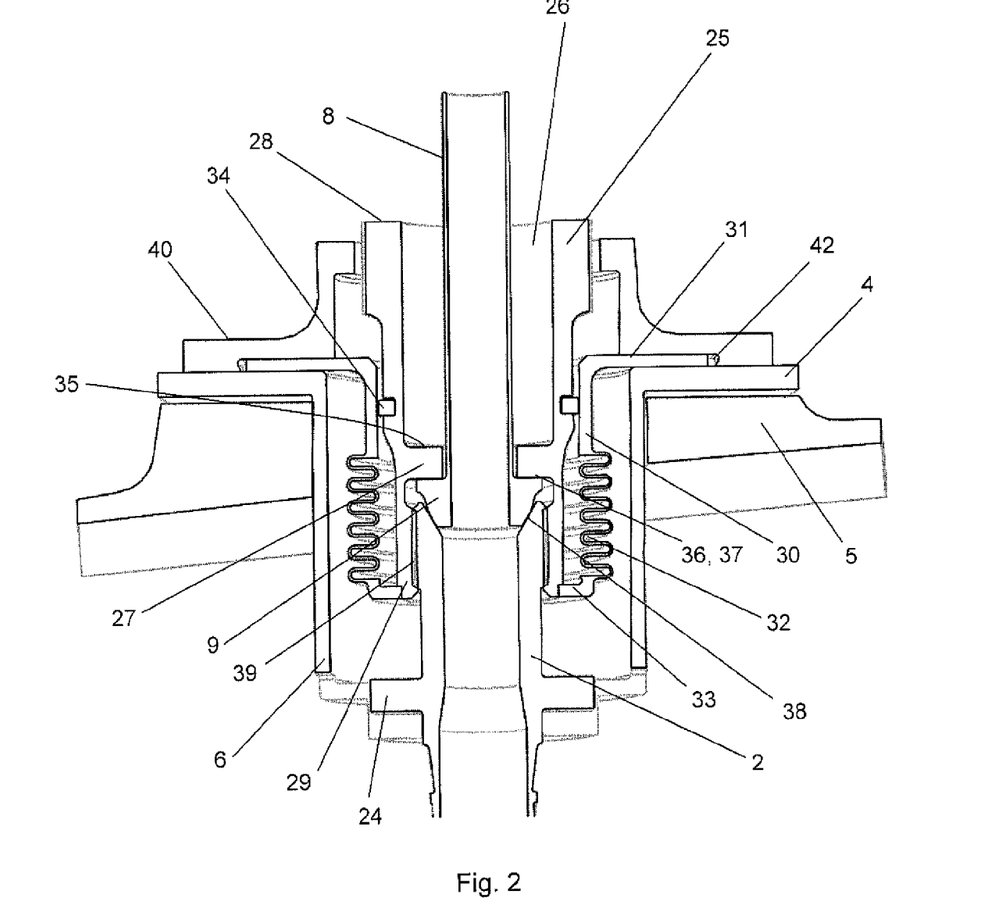
FIGS. 2 and 3 show a cross-sectional view through a first embodiment of fastener assembly according to the present invention.
Figure 3:
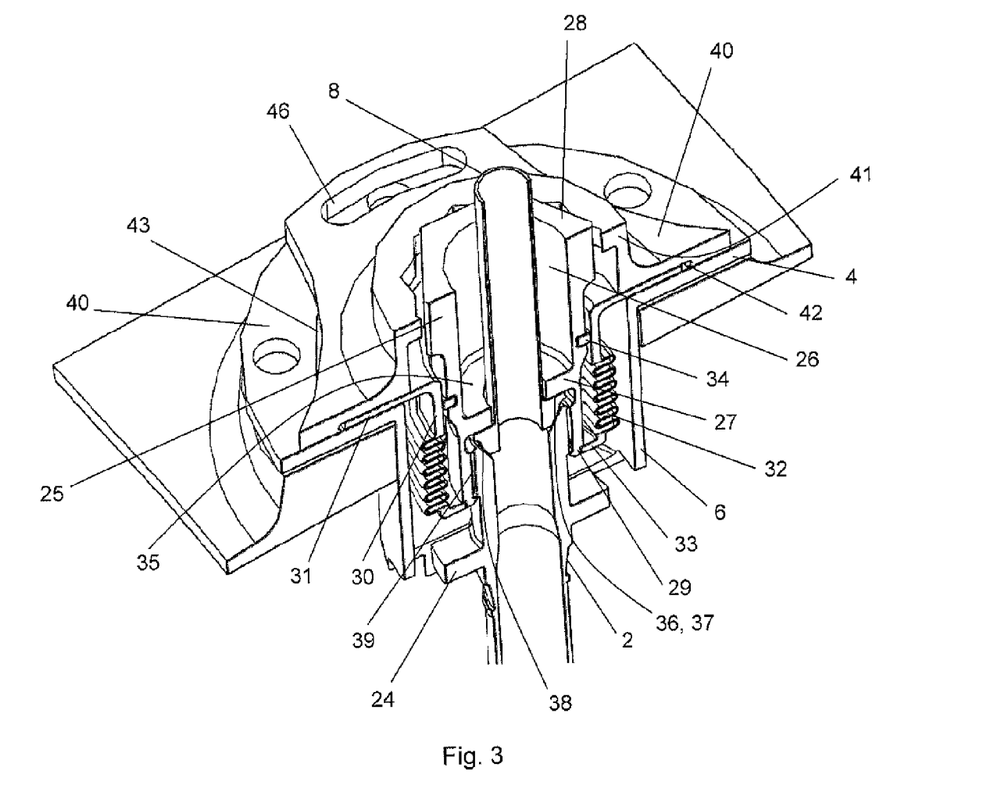

A prior art fastener assembly for connecting internal and external pipes in a bearing support structure is shown in FIG. 1.

An internal pipe 1 of the turbine bearing support is provided with a threaded adapter 2. The adapter 2 has a spherical sealing surface 3 provided with an anti-wear coating. A sleeve has a laterally extending portion 4 which is bolted to the casing 5 and an axially extending portion 6 which carries a sealing surface 7 which abuts the spherical sealing surface 3 on the adapter 2. The adapter 2 includes anti-rotation dog members 24 which are engaged in a slot in the axially extending portion 6 of the sleeve to react against the applied torque loads and prevent over-torquing of the pipe 1.

An external pipe of the turbine bearing support is provided with a ferrule 8 having a flange 9. The flange 9 is secured against the adapter 2 using a threaded nut 10, the threads of the threaded nut 10 mating with the threaded adapter 2. The components are locked into place using a positive locking device such as a locking wire or anti-rotation bracket.

There are a number of problems with this prior art fastener assembly.

Firstly, any axial or radial movement of the pipes resulting from, for example, build misalignment or tolerance build-up, thermal expansion or engine running conditions, may result in fretting or uneven wear at the sealing surfaces causing the seals to fail. This is particularly problematic with the spherical sealing surfaces of the prior art fastener assembly design which are difficult to manufacture consistently.

Whilst anti-wear/anti-fret coatings are provided on the sealing surfaces of the adapter 3 and the sleeve 7, the cost of these coatings is significant and they are often unsuitable for use at the elevated temperatures associated with gas turbines.

Furthermore, extraction of the prior art assembly for replacement of worn parts can be tricky as a result of the interference at the spherical sealing surfaces.

SUMMARY OF THE INVENTION

In a first aspect, the present invention provides a fastener for connecting two pipe adapters within a casing, the fastener comprising a fastener body having a central bore with a first engagement portion for engagement with a first pipe adapter and a second engagement portion for engagement with a second pipe adapter, wherein the fastener further comprises an outer wall at least partly surrounding and spaced from said fastener body, the outer wall comprising a fastener flange extending radially in a direction away from said fastener body for overlaying the casing, at least a portion of the outer wall being deformable in use so as to dampen axial and/or radial movement of the pipe adapters.

In a second aspect, the present invention provides a fastener assembly for connecting two pipe adapters within a casing, the fastener assembly comprising:

a first pipe adapter having a first pipe adapter engagement portion;

a second pipe adapter having a second pipe adapter engagement portion; and a fastener comprising a fastener body having a central bore with a first engagement portion in engagement with the first pipe adapter engagement portion and a second engagement portion in engagement with the second pipe adapter engagement portion;

wherein the fastener further comprises an outer wall at least partly surrounding and spaced from said fastener body, the outer wall comprising a fastener flange extending radially in a direction away from the fastener body for overlaying the casing, at least a portion of the outer wall being deformable in use so as to dampen axial and/or radial movement of the pipes.

The fastener flange overlays and may be secured to the casing thus securing the fastener body into position. The deformable outer wall portion (which may be is in a concentric arrangement about the fastener body) may dampen axial and radial movement of the pipe adapters resulting from build misalignment/tolerance build-up, thermal expansion and engine vibration without compromising the seal between the two pipes. This may reduce wear on the fastener/fastener assembly components and pipes and increases component/pipe life.

Optional features of the invention will now be set out. These are applicable singly or in any combination with any aspect of the invention.

In some embodiments, the deformable portion of the outer wall is a flexible wall portion e.g. a resiliently flexible wall portion. The deformable/flexible wall portion may be a corrugated wall portion. In this case, the deformable/flexible outer wall portion forms "bellows" surrounding the fastener body, the bellows dampening axial and radial movement of the fastener body and pipes.

In some embodiments, the deformable portion of the outer wall is formed of a steel or nickel alloy such as Inconell™.

In some embodiments, the outer wall may contain at least one aperture for pressure balancing, purging or draining of fluids.

In some embodiments, a first end of the outer wall is welded to the fastener body.

In some embodiments, the first engagement portion in the central bore of the fastener body is a radial projection extending into the central bore. In these embodiments, the first pipe adapter engagement portion is an annular flange for abutment against the radial projection. For example, the first pipe adapter may be a ferrule having an annular flange.

In some embodiments, the second engagement portion in the central bore of the fastener body is a threaded portion. In these embodiments, the second pipe adapter engagement portion is a threaded portion on the outer wall of the second pipe adapter.

In some embodiments, the fastener body is a threaded nut.

The fastener body has an upper axial end and a lower axial end with the first engagement portion/radial projection axially spaced between the upper and lower axial ends. The second engagement portion/threaded portion is proximal the lower axial end.

In some embodiments, the first end of the outer wall is connected to the fastener body at an axial position between the first engagement portion/radial projection and lower axial end, for example, proximal or at the lower axial end.

In other embodiments, the first end of the outer wall is connected to the fastener body at an axial position between the first engagement portion/radial projection and the upper axial end.

In some embodiments, the fastener body comprises a secondary seal on an outer surface at an axial position between the first engagement portion/radial projection and the upper axial end of the fastener body. This may control leakages in the event that the deformable wall portion fails.

The secondary seal may be a split ring, a piston ring, an o-ring or a profiled ring such as an E or C seal. The secondary seal may be formed of metal or an elastomeric polymer.

In some embodiments, the secondary seal is provided on the outer surface of the fastener body between the fastener body and the outer wall. The portion of the outer wall in abutment the secondary seal is non-deformable/flexible.

In some embodiments, the secondary seal is provided on the outer surface of the fastener body remote from the outer wall.

In some embodiments, the fastener flange is an annular flange. The fastener flange may depend from a second end of the outer wall or it may depend from a position on the outer wall spaced from the second end.

In some embodiments, the fastener assembly further comprises a clamping ring for clamping the fastener flange to the casing. The clamping ring may comprise cut-outs to reduce weight.

The clamping ring further comprises an upstanding element defining a bore for receiving the fastener body. The cross-sectional profile of the bore is adapted to engage the fastener body to lock the fastener in position.

In some embodiments, the fastening assembly further comprises a sleeve e.g. a top-hat sleeve comprising a lateral annular portion and an axial portion wherein the lateral annular portion is interposed between the fastener flange and the casing and the axial portion at least partly surrounds the second pipe adapter.

In these embodiments, the axial portion may have at least one slot for receiving a corresponding anti-rotation dog member on the second pipe adapter to prevent over-torquing of the second pipe adapter.

In some embodiments, especially embodiments where the first end of the outer wall is connected to the fastener body at an axial position between the first engagement portion/ radial projection and the upper axial end and the secondary seal is provided on the outer surface of the fastener body remote from the outer wall, the fastening assembly further comprises a second sleeve comprising a second lateral annular sleeve portion and a second axial sleeve portion wherein the second lateral annular sleeve portion is interposed between the fastener flange and the first lateral annular sleeve portion or the casing. In these embodiments, the secondary seal is provided between the outer surface of the fastener body and the second axial sleeve portion. The second sleeve may be integral with the outer wall of the fastener (in which case, the second axial sleeve portion and the fastener flange may be a single element).

In a third aspect, the present invention provides a gas turbine having a fastener or a fastener assembly according to the first or second aspects.

In fourth aspect, the present invention provides a turbine engine having a gas turbine according to the third aspect. The turbine engine may be, for example, an aero engine, a marine engine, an industrial turbine (for powering pumps etc.) or an electricity generator.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Referring to FIGS. 2, 3 and 5a and 5b, a first embodiment of the fastener assembly according to the present invention includes a fastener having a fastener body 25 with a central bore 26 and a first engagement portion in the form of a radial projection 27 extending into said central bore 26. The radial projection has an upper surface 35 and a lower surface 36.

The fastener body 25 has an upper axial end 28 and a lower axial end 29 with the radial projection 27 axially spaced between the upper and lower axial ends 28, 29.

The central bore 26 is partially threaded i.e. is threaded from below the radial projection 27 to the lower axial end 29. The threaded portion towards the lower axial end 29 constitutes a second engagement portion.

The fastener further comprises an outer wall 30 which at least partly surrounds and is spaced from said fastener body in a concentric arrangement. The outer wall 30 comprises a fastener flange 31 extending radially in a direction away from said fastener body 25.

A deformable/flexible portion 32 of the outer wall 30 is provided in the form of a corrugated wall portion which provides "bellows" surrounding part of the fastener body 25.

The deformable/flexible portion 32 of the outer wall 30 is formed of Inconell™ or other temperature resistant material such as a steel or nickel based alloy.

A first end 33 of the outer wall 30 is welded to the fastener body 25 at the lower axial end 29 of the fastener body 25.

The fastener body 25 comprises a secondary seal 34 on an outer surface at an axial position between the radial projection 27 and the upper axial end 28 of the fastener body 25.

The secondary seal may be a split ring, a piston ring, an o-ring or a profiled ring such as an E or C seal. The secondary seal may be formed of metal or an elastomeric polymer.

The secondary seal 34 is provided on the outer surface of the fastener body 25 between the fastener body 25 and the outer wall 30. The portion of the outer wall 30 in abutment the secondary seal is non-deformable/flexible.

The outer wall 30 may also include at least one aperture (not shown) for pressure balancing, purging or draining of fluids.

The fastener flange 31 is an annular flange.

The fastener assembly further comprises a first pipe adapter for fitting to an end of a first pipe and a second pipe adapter 2 for fitting to the end of a second pipe.

The first pipe is an external pipe i.e. external to the turbine whilst the second pipe is an internal pipe i.e. internal to the turbine.

The first pipe adapter may be a ferrule. The first pipe adapter 8 has an adapter flange 9 with an upper surface 37 and a lower surface 38.

The second pipe adapter 2 has a threaded outer surface 39 for mating with the threaded central bore 26 of the fastener body 25. It includes anti-rotation dog members 24.

To form the fastener assembly, a top-hat sleeve is inserted into a bore in the casing 5. The top-hat sleeve has a lateral annular portion 4 which overlays the casing 5 and includes holes through which pins or bolts are inserted to secure the top-hat sleeve to the casing 5.

An axial portion 6 of the top-hat sleeve is centred over the second pipe adapter 2 so that the anti-rotation dog members 24 on the second pipe adapter 2 are received within slots in the axial portion 6 to react against the applied torque loads and prevent subsequent over-torquing of the second pipe adapter 2.

The first pipe adapter 8 is fitted to the fastener with the upper surface 37 of the adapter flange 9 in abutment with the lower surface 36 of the radial projection 27.

The fastener and first pipe adapter 8 are inserted into the bore in the casing 5 and the fastener rotated so that the threaded portion of the central bore 26 of the fastener body 25 cooperates with the threaded surface 39 on the second pipe adapter 2 until the lower surface 38 of the adapter flange 9 of the first pipe adapter 8 is in abutment with the second pipe adapter 2. The locking of the anti-rotation dog members 24 by the axial portion 6 of the top-hat sleeve ensures that the second pipe adapter 2 does not rotate.

The fastener flange 31 is brought into abutment with the lateral annular portion 4 of the top-hat sleeve.

Next, a clamping ring 40 having an upstanding element 41 is centred over the fastener with the fastener flange 31 located between the lateral annular portion 4 of the top-hat sleeve and the clamping ring 40. The underside of the clamping ring has a recess 42 for receiving the fastener flange 31 and any additional gaskets or spacers.

The clamping ring 40 has cut-outs 43 to reduce with weight of the assembly and slots 46 through which pins/bolts can be secured to the top-hat sleeve/casing 5 to clamp the fastener flange 31 to the casing.

The bolts/pins in the clamping ring 40 and the lateral annular portion 4 of the top-hat sleeve secure the fastener assembly in the casing and securely join the internal and external pipes.

As axial/radial movement of the pipes/adapters occurring as a result of, for example, build misalignment or tolerance build-up, thermal expansion or engine running conditions, the movement is dampened by the bellows i.e. by the corrugated deformable/flexible outer wall portion so that the seal between the two adapters 8, 2 remains uncompromised.

In case of failure of the deformable wall portion, the secondary seal 34 prevents/minimises the escape of hot gas/liquid from within the turbine casing.

Figure 4:
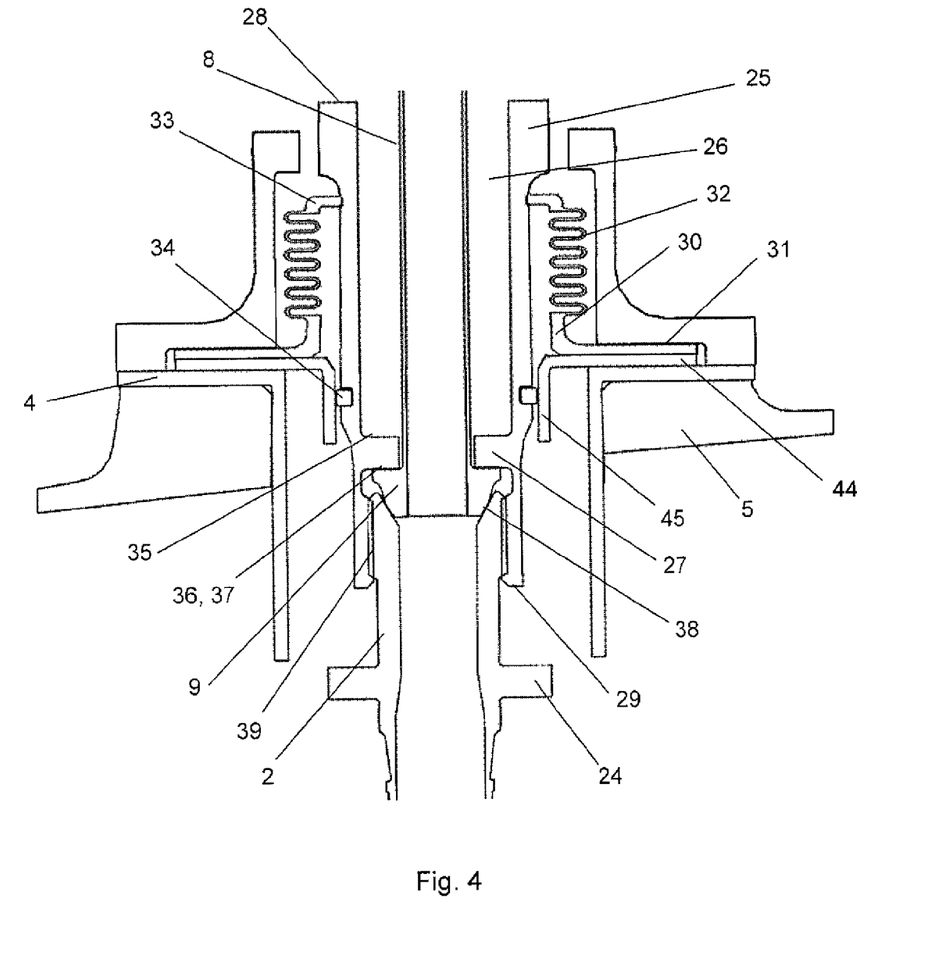
FIG. 4 shows a cross-sectional view through a second embodiment of fastener assembly according to the present invention.
Figures 5A, 5B:
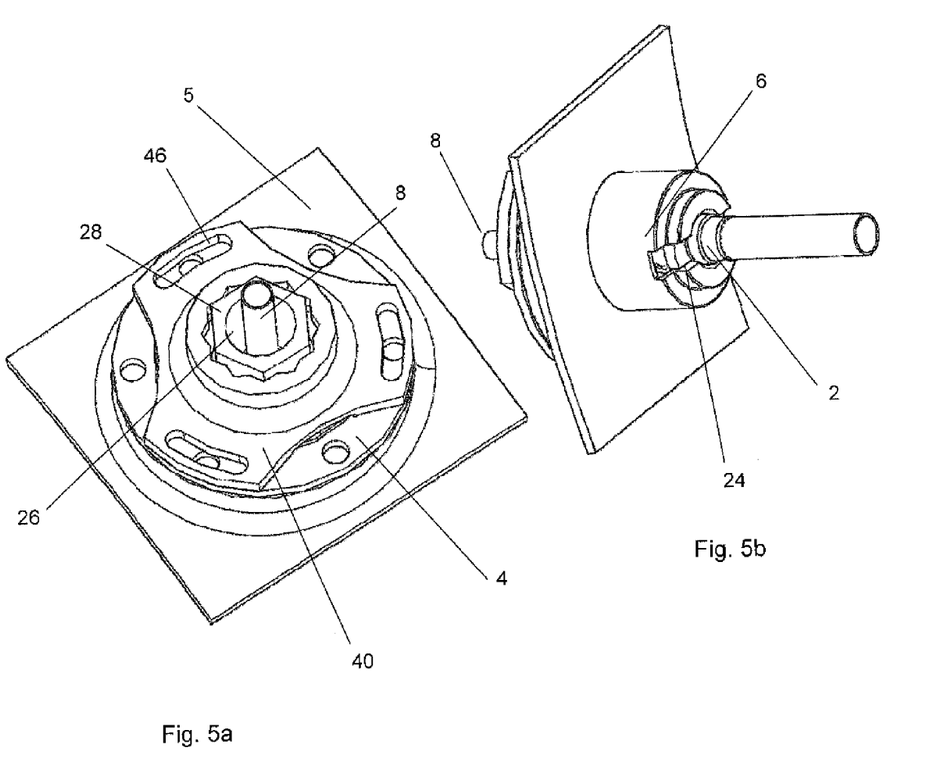
FIGS. 5a and 5b show a top and bottom view of the first and second embodiments of the fastener assembly according to the present invention.

Referring to FIGS. 4 and 5a and 5b, a second embodiment of the fastener assembly according to the present invention is shown with many features in common with the first embodiment. Like features are shown using the same reference numerals and they will not be described again here.

In this second embodiment, the first end 33 of the outer wall 30 is welded to the fastener body 25 above the radial projection 27 towards the upper axial end 28 of the fastener body 25. This means that the bulk of the fastener including the deformable wall portion (bellows) are external to the turbine and thus more easily accessible should replacement be needed.

The secondary seal 34 is provided on the outer surface of the fastener body 25 remote from the outer wall 30.

After insertion and centring of the top-hat sleeve into the bore in the casing 5, a second sleeve comprising a second lateral annular sleeve portion 44 and a second axial sleeve portion 45 is inserted so that the second lateral annular sleeve portion 44 overlays the lateral annular sleeve portion 4 of the top-hat sleeve.

The second axial sleeve portion 45 abuts the secondary seal 34.

In some embodiments (not shown), the second sleeve may be formed integrally with the outer wall 30 in which case it is inserted into the bore in the casing at the same time as the first pipe adapter 8 and fastener. In these embodiments, the second lateral annular sleeve portion 44 and the fastener flange 31 may be a unitary flange.

Figure 6:
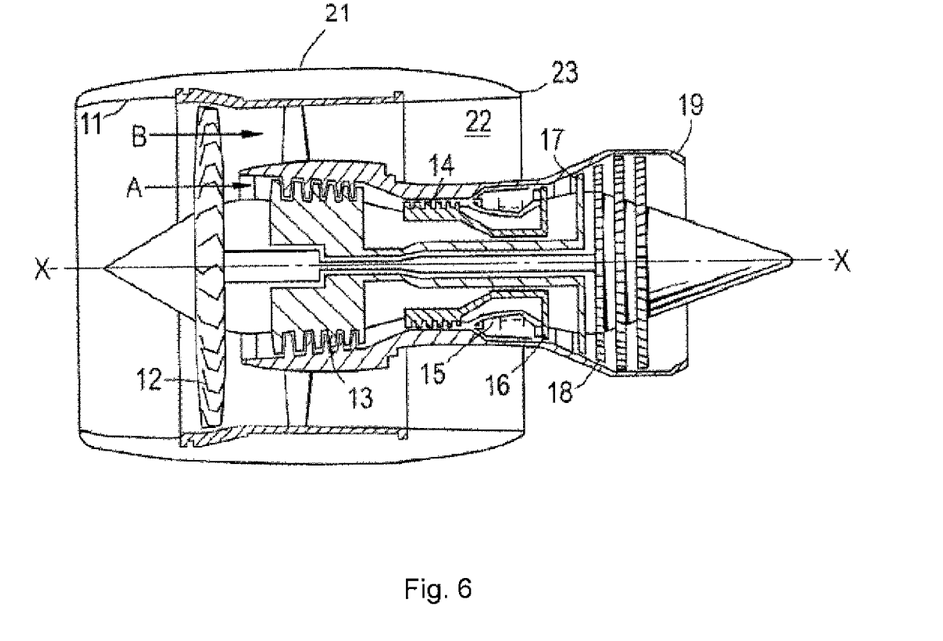
FIG. 6 shows a cross-sectional view of a turbine engine comprising a fastener assembly according to the present invention.

Referring to FIG. 6, a gas turbine engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Service pipes carrying gases (e.g. compressed air) and liquids (e.g. lubricating oils) are required to pass through the various components and the seals at the connections between the pipes internal to the turbines 16, 17, 18 can be compromised owing to the high temperatures/pressures in the turbines 16, 17, 18.

Fastener assemblies described above as the first and second embodiments are provided at the intermediate- and low-pressure turbines 17, 18 to secure the service pipes.

It will be understood that the invention is not limited to the embodiments above-described and various modifications and improvements can be made without departing from the various concepts described herein. Except where mutually exclusive, any of the features may be employed separately or in combination with any other features and the invention extends to and includes all combinations and sub-combinations of one or more features described herein in any form of fastener or fastener assembly.

All references referred to above are hereby incorporated by reference.

The invention claimed is:

1. A fastener for connecting two pipe adapters within a casing, the fastener comprising
    a fastener body having a central bore with a first engagement portion for engagement with a first pipe adapter and a second engagement portion for engagement with a second pipe adapter; and
    an outer wall at least partly surrounding and spaced from said fastener body, wherein:
        the outer wall has a first end directly connected to the fastener body,
        the outer wall comprises a fastener flange extending radially in a direction away from said fastener body for overlaying the casing such that a free end of the fastener flange is spaced from the fastener body, and
        at least a portion of the outer wall is deformable in use so as to dampen axial and/or radial movement of the pipe adapters.

2. A fastener according to claim 1 wherein the deformable portion of the outer wall is a flexible wall portion.

3. A fastener according to claim 1 wherein the deformable/flexible wall portion is a corrugated wall portion.

4. A fastener according to claim 1 wherein said fastener body has an upper axial end and a lower axial end with the first engagement portion axially spaced between the upper and lower axial ends, and wherein the first end of the outer wall is connected to the fastener body at an axial position between the first engagement portion and the lower axial end.

5. A fastener according to claim 4 wherein said fastener body comprises a secondary seal on an outer surface at an axial position between the first engagement portion and the upper axial end of the fastener body.

6. A fastener according to claim 5 wherein said secondary seal is provided on the outer surface of the fastener body between the fastener body and the outer wall.

7. A fastener according to claim 5 wherein said secondary seal is provided on the outer surface of the fastener body remote from the outer wall.

8. A fastener according to claim 1 wherein said fastener body has an upper axial end and a lower axial end with the first engagement portion axially spaced between the upper and lower axial ends, and wherein the first end of the outer wall is connected to the fastener body at an axial position between the first engagement portion and the upper axial end.

9. A fastener according to claim 1 wherein the first engagement portion is a radial projection extending into the central bore.

10. A fastener according to claim 1 wherein the second engagement portion is a threaded portion.

11. A gas turbine having a fastener as defined in claim 1.

12. An assembly comprising:
    a casing;
    a first pipe adapter having a first pipe adapter engagement portion;
    a second pipe adapter having a second pipe adapter engagement portion, wherein the first pipe adapter and the second pipe adapter are connected within the casing; and
    a fastener comprising a fastener body having a central bore with a first engagement portion in engagement with the first pipe adapter engagement portion and a second engagement portion in engagement with the second pipe adapter engagement portion; wherein:
        the fastener further comprises an outer wall at least partly surrounding and spaced from said fastener body,
        the outer wall has a first end connected to the fastener body,
        the outer wall comprises a fastener flange extending radially in a direction away from the fastener body such that the fastener flange overlays the casing, and
        at least a portion of the outer wall is deformable in use so as to dampen axial and/or radial movement of the pipes.

13. An assembly according to claim 12 further comprises a clamping ring for clamping the fastener flange to the casing.

14. An assembly according to claim 13 wherein the clamping ring further comprises an upstanding element for surrounding the fastener body.

15. An assembly according to claim 12 further comprises at least one sleeve having a lateral annular portion and an axial portion wherein the lateral annular portion is interposed between the fastener flange and the casing.

* * * * *

UNITED STATES PATENT AND TRADEMARK OFFICE
CERTIFICATE OF CORRECTION

PATENT NO.       : 9,506,403 B2                                   Page 1 of 1
APPLICATION NO.  : 14/593483
DATED            : November 29, 2016
INVENTOR(S)      : Samuel John MacLaren Clarke

It is certified that error appears in the above-identified patent and that said Letters Patent is hereby corrected as shown below:

On the Title Page

Item (73) reads:
Assignee: ROLLS-ROYCS

Should read:
Assignee: ROLLS-ROYCE plc

Signed and Sealed this
Twenty-eighth Day of March, 2017

Michelle K. Lee
*Director of the United States Patent and Trademark Office*